United States Patent [19]
Roetker

[11] Patent Number: 5,666,989
[45] Date of Patent: Sep. 16, 1997

[54] TANK VENTING CONTROL ASSEMBLY

[75] Inventor: John J. Roetker, Connersville, Ind.

[73] Assignee: Stant Manufacturing Inc., Connersville, Ind.

[21] Appl. No.: 336,184

[22] Filed: Nov. 8, 1994

[51] Int. Cl.⁶ .................... F16K 17/36; F16K 17/18
[52] U.S. Cl. ............. 137/43; 137/202; 137/493.2; 137/493.6; 137/493.9; 137/599.2
[58] Field of Search .............. 137/202, 43, 493.1, 137/493.2, 493.6, 493.9, 599.2

[56] References Cited

U.S. PATENT DOCUMENTS

| | | | |
|---|---|---|---|
| 3,302,658 | 2/1967 | De Frees | 137/43 |
| 3,738,384 | 6/1973 | Hall | 137/493.9 |
| 4,000,828 | 1/1977 | Crute et al. | 137/43 X |
| 4,007,643 | 2/1977 | Matsushita | 137/38 |
| 4,378,815 | 4/1983 | Mochida et al. | 137/43 |
| 4,416,108 | 11/1983 | Ghandhi | 220/202 |
| 4,498,493 | 2/1985 | Harris | 137/493.6 |
| 4,693,847 | 9/1987 | Szlaga | 137/43 |
| 4,735,226 | 4/1988 | Szlaga | 137/43 |
| 4,760,858 | 8/1988 | Szlaga et al. | 137/43 |
| 4,953,583 | 9/1990 | Szlaga | 137/118 |
| 4,991,615 | 2/1991 | Szlaga et al. | 137/43 |
| 5,028,244 | 7/1991 | Szlaga | 137/202 |
| 5,065,782 | 11/1991 | Szlaga | 137/43 |
| 5,234,013 | 8/1993 | Roetker et al. | 137/43 |

*Primary Examiner*—Stephen M. Hepperle
*Attorney, Agent, or Firm*—Barnes & Thornburg

[57] ABSTRACT

A fuel vapor control valve for controlling the flow of fuel vapor and liquid fuel through an aperture in a fuel tank is provided. The fuel vapor control valve includes a housing mounted in the aperture and formed to include an inlet and an outlet, a chamber disposed in the housing, a pressure-relief valve disposed in the camber, and a vacuum valve disposed in the chamber and formed for movement relative to the pressure-relief valve. The vacuum valve is biased to relieve subatmospheric tank pressure below a predetermined minimum pressure and includes a base that is mounted on the pressure-relief valve and arranged to define a venting aperture. In addition, the fuel vapor control valve includes a ball that is movably positioned in the chamber to selectively interrupt the flow of fuel vapor through the venting aperture.

31 Claims, 8 Drawing Sheets

TANK VENTING CONTROL ASSEMBLY

BACKGROUND AND SUMMARY OF THE INVENTION

The present invention relates to fuel system valves, and particularly to a tank venting control assembly for regulating the flow of fuel vapor and air through a venting outlet provided in a fuel tank having a separate filler neck. More particularly, the present invention relates to a vehicle fuel vapor control valve which performs pressure-relief and vacuum-relief functions and also maintains a predetermined head pressure in the fuel tank during stationary refueling while relieving some fuel vapor pressure in the fuel tank when the vehicle is in motion.

Vehicle fuel systems are known to include tank pressure control valves configured to provide tank pressure relief and tank vacuum relief and to mount on either fuel tanks or filler necks. See, for example, U.S. Pat. No. 4,498,493 to Harris and U.S. Pat. Nos. 4,953,583 and 5,065,782 to Szlaga.

Although fuel pump nozzles are known to include sensor means for shutting off the flow of fuel from the nozzle when the fuel tank is nearly filled, it has been observed that users frequently manually override or bypass such fill-limiting sensors by continuing to pump fuel after the pump nozzle has automatically shut off several times. It will be appreciated that such unauthorized refueling practices can result in overfilling the fuel tank which can effectively reduce the fuel vapor expansion capacity available within the filled fuel tank.

It is also known to provide fuel vapor control valves for regulating tank pressure to prevent overfilling of the fuel tank during refueling. See, for example, U.S. Pat. No. 4,760,858 to Szlaga. Such a fuel vapor control valve includes a movable head valve for maintaining a head pressure within the fuel tank which exceeds the maximum head pressure that can develop in the filer neck due to filling the filler neck with fuel during refueling. Such a fuel vapor control valve aids in preventing fuel pump operators from overfilling fuel tanks by providing a pressurized fuel vapor barrier within the fuel tank that acts to block the introduction of liquid fuel into the fuel tank in excess of a predetermined fuel capacity during refueling. Such a fuel vapor control valve is adapted to vibrate and release fuel vapor during vehicle transit to increase the flow of fuel vapor to a fuel vapor treatment site and/or the atmosphere, thereby enhancing engine performance.

What is needed is a fuel vapor control valve for preventing tank overfilling during refueling and for relieving vacuum conditions that develop in a tank. Consumers would welcome a fuel vapor control valve that was also operable to vent minimal or residual tank pressure during motion of a vehicle carrying the tank and/or excessive tank pressure whether the vehicle is in motion or stationary.

According to the present invention, a fuel vapor control valve is provided for controlling the flow of fuel vapor and liquid fuel through an aperture in the fuel tank of a vehicle. The fuel vapor control valve includes a housing configured to mount in the aperture formed in the fuel tank. The housing is formed to include an inlet communicating with the fuel tank, a venting outlet, and a chamber interconnecting the tank inlet and the venting outlet in fluid communication.

A vacuum-relief valve is positioned in the chamber and is biased to a normally closed position by a spring. The vacuum-relief valve is movable to relieve subatmospheric tank pressure in response to exposure of the vacuum-relief valve to a tank pressure below a predetermined minimum tank vapor fuel pressure. The vacuum-relief valve includes a base configured to support a valve member and formed to include a venting aperture. The fuel vapor control valve further includes a ball-type head valve positioned for movement in the chamber to prevent tank overfilling when the vehicle carrying the fuel tank is stationary and to vent residual tank pressure through the chamber and the venting outlet when the vehicle is in motion.

In preferred embodiments, the fuel vapor control valve further includes a pressure-relief valve in the housing chamber in addition to the ball-type head valve. In use, the pressure-relief valve operates to vent excessive tank pressure to a fuel vapor treatment canister or other destination through the venting outlet formed in the housing. Advantageously, the ball-type head valve operates during motion of a vehicle carrying the fuel tank to vent residual tank pressure to the canister even though tank pressure does not exceed the level required to activate the pressure-relief valve. This residual pressure is normally the pressure that is left in the tank after refueling.

During refueling, the ball-type head valve closes the venting outlet to cause a pressurized fuel vapor barrier to develop within the fuel tank. This barrier acts to block the introduction of liquid fuel into the fuel tank through the filler neck once the fuel tank is filled to its rated capacity. However, once refueling is completed and this barrier is no longer needed the ball-type head valve moves in response to vehicle movement to open a vent passage in the housing chamber and vent some of the residual tank pressure through the venting outlet to the canister.

In one embodiment, the fuel vapor control valve includes a pressure-relief valve and a separate ball-type head valve is carried in a cage appended to the vacuum-relief valve. In another embodiment, the fuel vapor control valve ball-type head valve is carried in a cage appended to the vacuum-relief valve. In yet another, the fuel vapor control valve includes only a ball-type head valve carried in a cage appended to a vacuum-relief valve.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
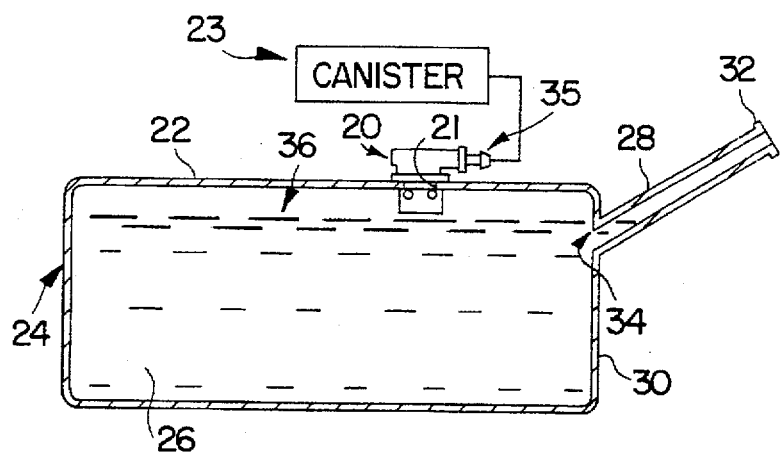
FIG. 1 is a diagrammatic illustration of a fuel vapor control valve in accordance with the present invention mounted in the top wall of a vehicle fuel tank.
Figure 5:
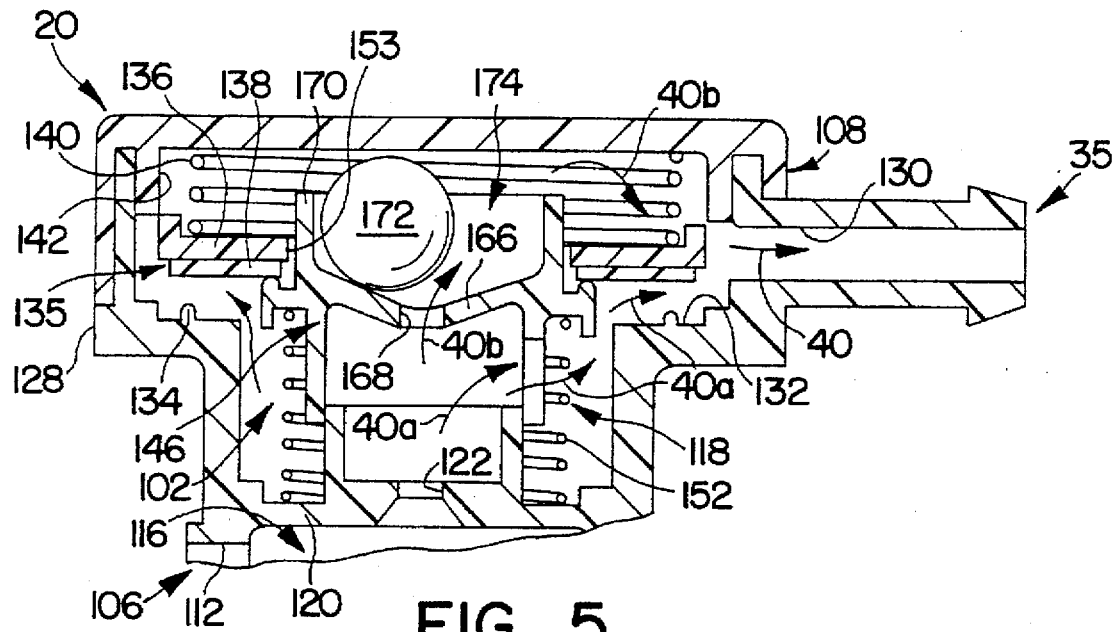
FIG. 5 is a view similar to FIG. 4 showing the fuel-vapor control valve in another pressure-release position with the annular pressure-relief valve raised away from its underlying seat while the vehicle is in motion, which motion causes the ball-type head valve to move laterally and uncover the underlying venting aperture, thereby providing an additional path for the escape of pressurized fuel vapor from the vehicle fuel tank to the venting outlet.
Figure 6:
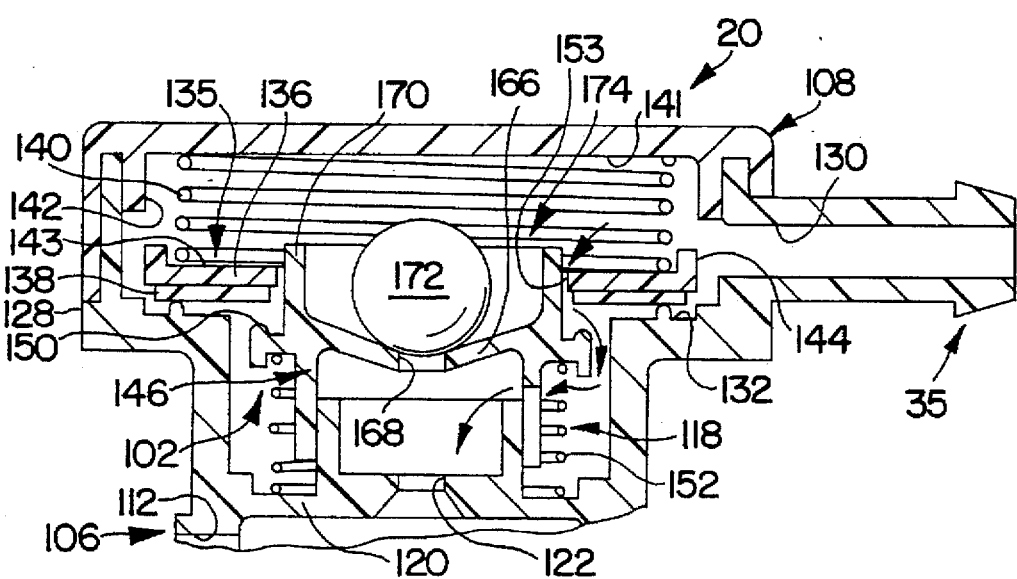
FIG. 6 is a view similar to FIG. 5 showing the fuel vapor control valve in a vacuum-relief position with the vacuum-relief valve pulled against its biasing spring and away from sealing engagement with the underside of the annular pressure-relief valve due to subatmospheric tank pressure, thereby permitting the flow of air from the atmosphere through the venting outlet and the upper chamber into the fuel tank.
Figure 7:
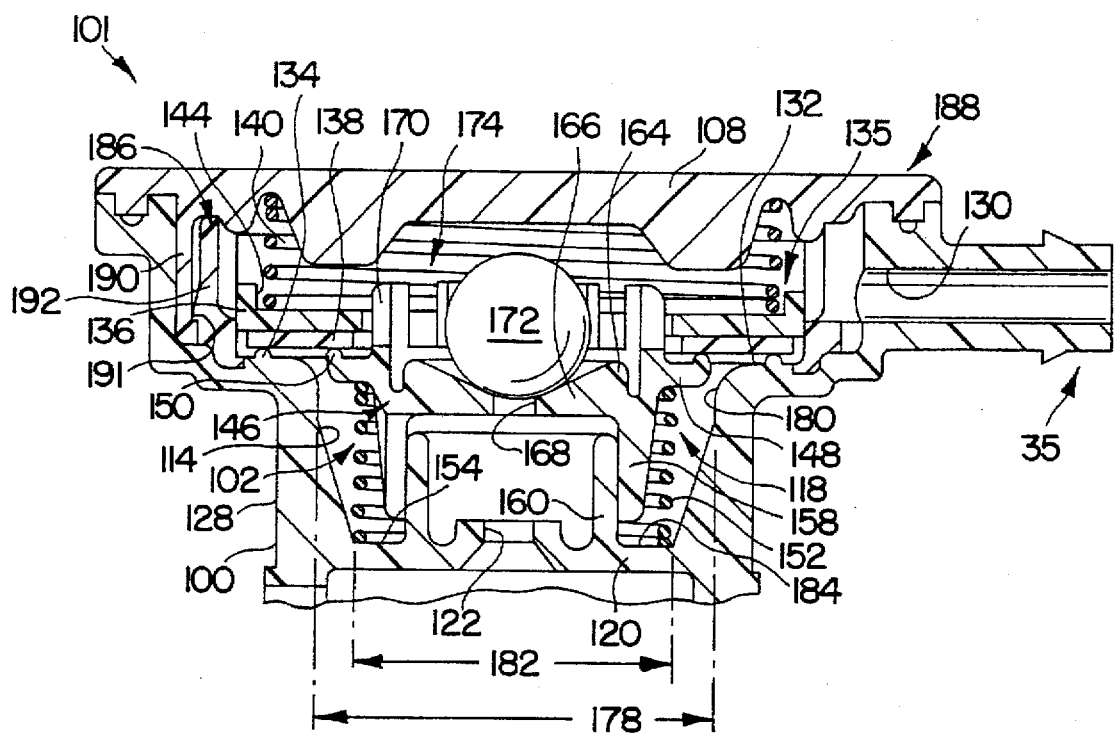
FIG. 7 is a sectional detail view of a presently preferred embodiment of a fuel vapor control valve in accordance with the present invention.
Figure 8:
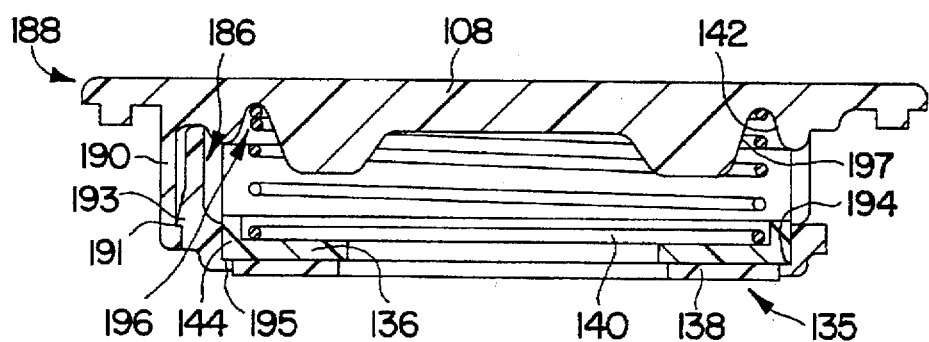
FIG. 8 is a sectional detail view of a spring-loaded pressure-relief valve subassembly included in the fuel vapor control valve illustrated in FIG. 7 showing the pressure-relief valve biased by its biasing spring away from the overlying cover and held in place by a spring-loading piece surrounding the pressure-relief valve.
Figure 13:
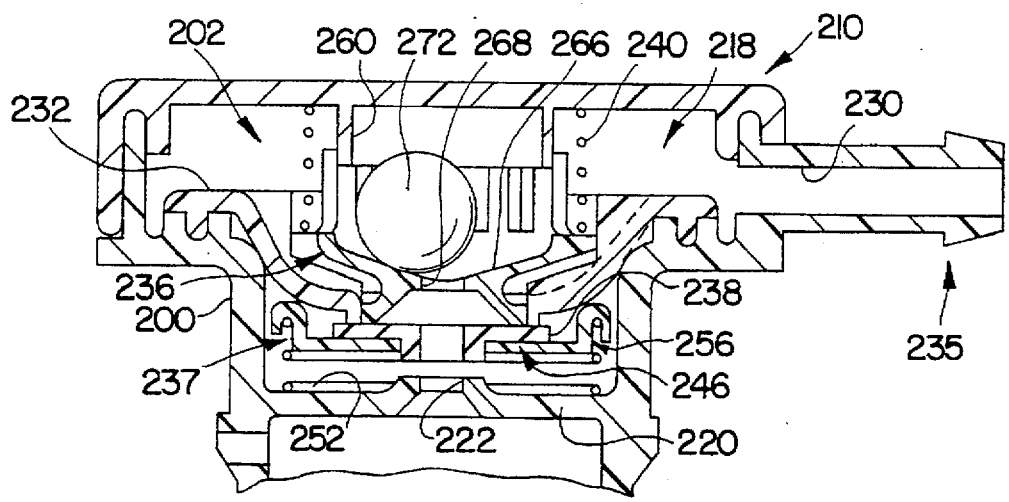
FIG. 13 is a view similar to FIGS. 10–12 showing lateral displacement of the ball-type head valve during vehicle motion resulting in the flow of some pressurized fuel vapor through the venting aperture formed in the pressure-release valve, even though the pressure-relief valve has not been raised away from the vacuum-relief valve to a pressurized fuel vapor-venting position.
Figure 14:
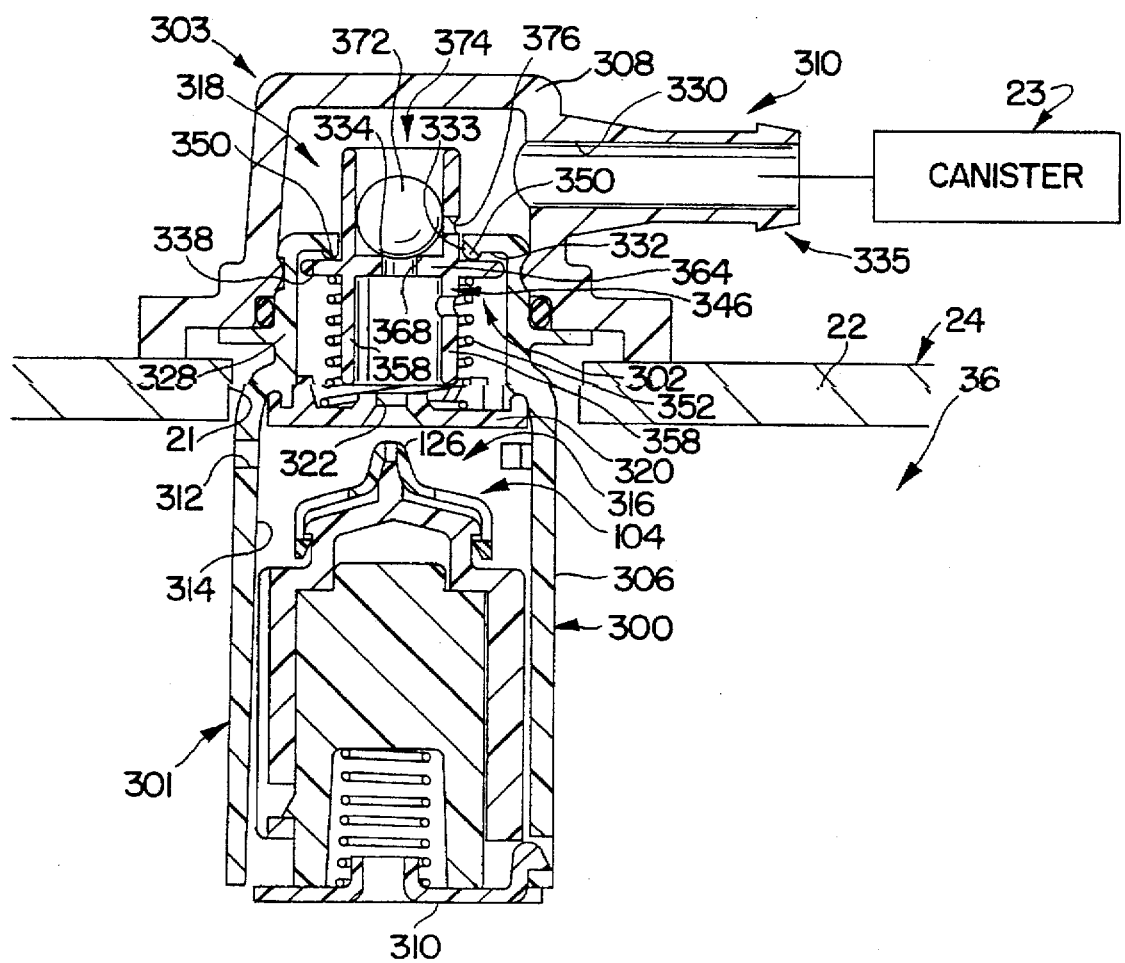
FIG. 14 is a sectional detail view of a fourth embodiment of the fuel vapor control valve in accordance with the present invention showing a lower chamber containing a rollover valve and an upper chamber communicating with a venting outlet and including a vacuum-relief valve carrying a head valve cage containing a ball-type head valve.
Figure 15:
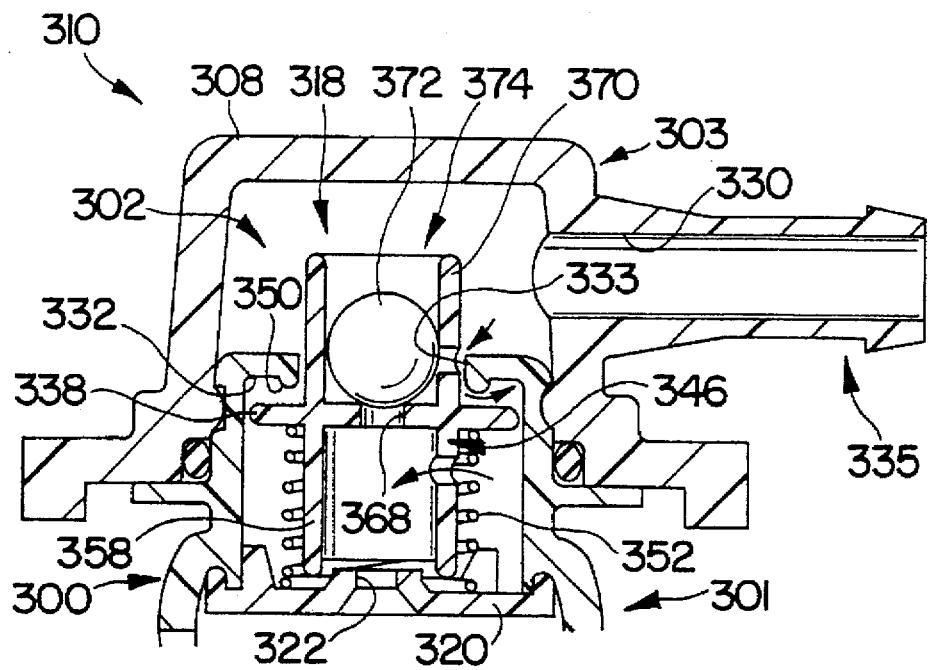
FIG. 15 is a view of the fuel vapor control valve illustrated in FIG. 14 showing the vacuum-relief valve pulled downwardly against its biasing spring and away from its overlying seat to establish a vacuum-relief position, thereby permitting the flow of air from the atmosphere through the venting outlet and upper chamber into the fuel tank.
Figure 16:
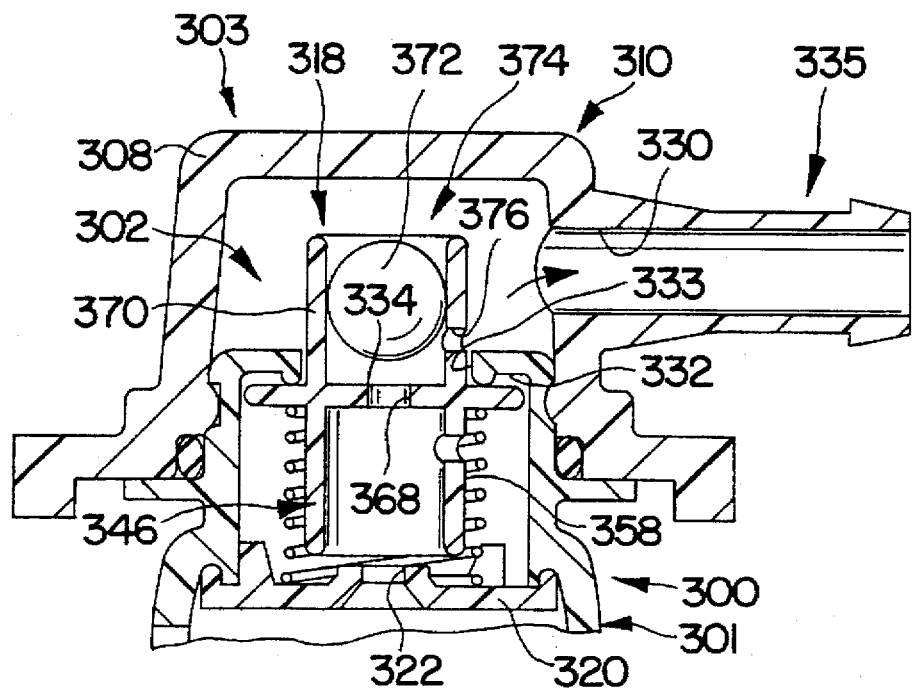
FIG. 16 is a view similar to FIG. 15 showing the ball-type head valve disengaged from a first aperture formed in a bottom wall of the head valve cage to establish a pressure-release position, thereby permitting the flow of pressurized fuel vapor from the fuel tank through the first aperture and a second aperture formed in a side wall of the head valve cage, through the upper chamber, and then through the venting outlet.

An illustration of a fuel vapor control valve 20 in accordance with the present invention is shown in FIG. 1 in one possible application mounted in the top wall 22 of a vehicle fuel tank 24. This fuel vapor control valve 20 functions to vent excess fuel vapor pressure from fuel tank 24 when tank pressure is too high, admit atmospheric air into the fuel tank 24 when tank pressure is too low, and vent some fuel vapor pressure from fuel tank 24 when the vehicle carrying fuel tank 24 is in motion. A first embodiment of the invention is illustrated in FIGS. 2–6, a second embodiment of the invention is illustrated in FIGS. 7 and 8, a third embodiment of the invention is illustrated in FIGS. 9–13, and a fourth embodiment of the invention is illustrated in FIGS. 14–16.

The fuel tank 24 is configured to hold a volatile fuel 26 that is capable of producing fuel vapor. As shown, the fuel vapor control valve 20 is fitted into an aperture 21 formed in the top wall 22 of fuel tank 24. It will be understood that the fuel vapor control valve 20 will normally be connected to an onboard fuel vapor treatment site such as a conventional fuel canister 23 or the like to receive the vented fuel vapor. It will be further understood that the fuel vapor control valve 20 could be positioned at other locations within the fuel system (not shown) other than that illustrated in FIG. 1.

A filler neck 28 is shown extending upwardly and outwardly from a side wall 30 of the fuel tank 24 in FIG. 1. The filler neck 28 includes an outer filler end 32 that is configured to receive fuel supplied by a fuel-dispensing nozzle (not shown). The filler neck 28 further includes an inner end 34 that joins the side wall 30 to provide fluid communication between the filler neck 28 and the fuel tank 24.

In operation, the fuel vapor control valve 20 permits fuel vapor to be vented from a vapor space 36 in fuel tank 24 to the canister 23 through a venting outlet 35 formed in fuel vapor control valve 20 when tank pressure exceeds a predetermined "maximum pressure" level. The vapor space 36 is located in an upper region inside fuel tank 24 above the top surface of liquid fuel 26 in fuel tank 24. It also permits fuel vapor from the canister 23 or ambient air from the atmosphere outside the fuel vapor control valve 20 to enter the fuel tank 24. When the vehicle (not shown) carrying fuel tank 24 is in motion, the fuel vapor control valve 20 permits generally unrestricted venting of fuel vapor from the fuel tank 24 to diminish tank pressure somewhat, even though the tank pressure has not exceeded the predetermined maximum pressure level. In addition, fuel vapor control valve 20 is configured to maintain a preselected pressure, or "pressure head" within the fuel tank 24 only when the vehicle is stationary. This preselected pressure head advantageously aids in preventing overfilling of the fuel tank 24 during the fuel filling operation.

Figure 2:
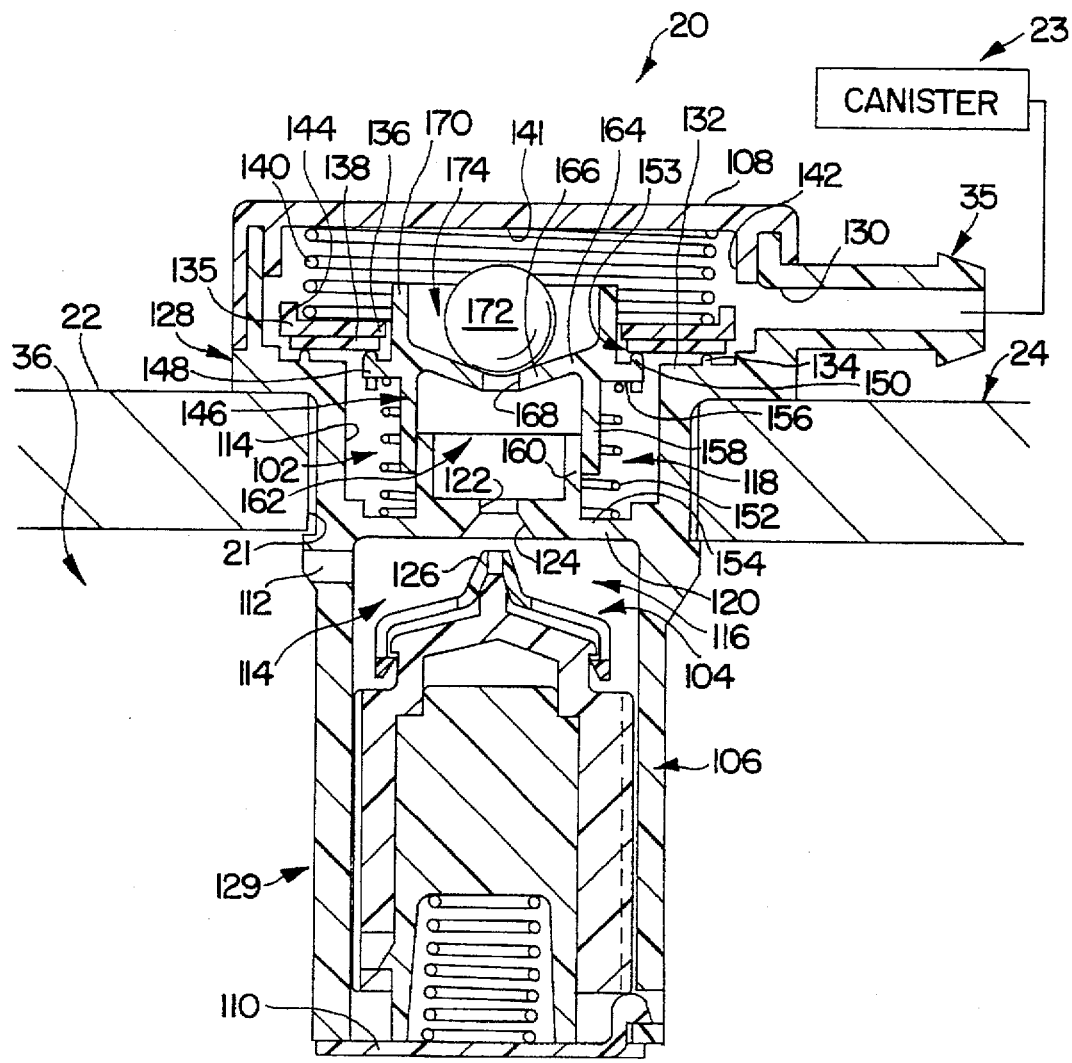
FIG. 2 is a sectional detail view of a first embodiment of the fuel vapor control valve in accordance with the present invention showing a lower chamber containing a roll-over valve, an upper chamber communicating with a side-discharge venting outlet and containing a spring-loaded annular pressure-relief valve normally closing a large aperture formed in the valve housing, a spring-loaded vacuum-relief valve normally closing a central aperture formed in the pressure-relief valve, a head valve cage appended to the vacuum-relief valve and positioned to extend through the central aperture in the pressure-relief valve, and a movable ball-type head valve in the head valve cage.

A first embodiment of a tank venting control assembly 102 is mounted inside fuel vapor control valve 20 and illustrated in FIG. 2. The tank venting control assembly 102 resides in a housing 100 adapted to be mounted in an aperture 21 formed in the top wall 22 of a vehicle fuel tank 24. The venting control assembly 102 is mounted in an upper portion of housing 100 to provide venting of fuel vapor from the vehicle fuel tank 24 at relatively high vapor flow rates when fuel vapor pressure rises above the predetermined maximum pressure level and to allow air to enter the vehicle fuel tank when the fuel vapor pressure in the fuel tank drops below a predetermined "minimum pressure" level due, e.g., to sudden cooling. A rollover valve assembly 104 is mounted in a lower portion of housing 100 to provide means for blocking flow of liquid fuel and fuel vapor through the tank-venting control assembly 102 when the vehicle fuel tank rolls over or experiences a change in attitude in excess of a predetermined amount. Advantageously, the tank venting control assembly 102 provides a compact, integrated package capable of performing pressure relief, rollover closure, and vacuum relief functions.

Housing 100 includes a cylindrical portion 106 extending into the fuel tank 24, a cover 108 which snap-fits onto an upper portion 128 of the cylindrical portion 106 at an upper end thereof, and a retainer 110 which snap-fits onto a lower portion 129 of the cylindrical portion 106 at a lower end thereof. The lower portion 129 of cylindrical portion 106 is formed to include a side inlet 112 allowing fuel vapor from a vapor space 36 in the fuel tank 24 to pass therethrough as shown best in FIG. 2.

Housing 100 also includes a hollow interior 114 which is partitioned into a lower rollover valve chamber 116 and an upper venting control chamber 118 by partition 120. Partition 120 is appended to cylindrical portion 106 and arranged to lie in a generally horizontal orientation inside hollow chamber 114 as shown in FIG. 2. A first venting aperture 122 formed in partition 120 interconnects the venting control chamber 118 and the rollover valve chamber 116 in fluid communication as shown in FIG. 2.

The lower rollover valve chamber 116 is bounded by the vertical lower cylindrical portion 129 of housing 100, the horizontal retainer 110, and the horizonal partition 120 as shown best in FIG. 2. The first venting aperture 122 provides a downwardly facing conically shaped valve seat 124 facing toward the underlying rollover valve assembly 104 situated in rollover valve chamber 116. The rollover valve assembly 104 is configured to provide means for regulating or selectively blocking flow of fuel vapor from the fuel tank 24 toward venting outlet 35 through the first venting aperture 122.

The rollover valve assembly 104 includes a nipple 126 adapted to seat against the conical valve seat 124 formed on partition 120 to prevent the flow of fuel vapor through the first venting aperture 122 during tilting of the vehicle fuel tank 24 in excess of a predetermined amount. Changes in vehicle fuel tank attitude in excess of a predetermined amount cause the rollover valve assembly 104 to move in the rollover valve chamber 116 to place the nipple 126 in engagement with the conical valve seat 124, thereby closing first venting aperture 122. Fuel vapor and liquid fuel which enters the rollover valve chamber 116 from fuel tank 24 through, e.g., side inlet 112 is thereby prevented from leaking out of fuel tank 24 through the first venting aperture 122. Thus, rollover valve assembly 104 can provide upstream means for regulating flow of fuel vapor to the venting control chamber 118.

Figure 9:
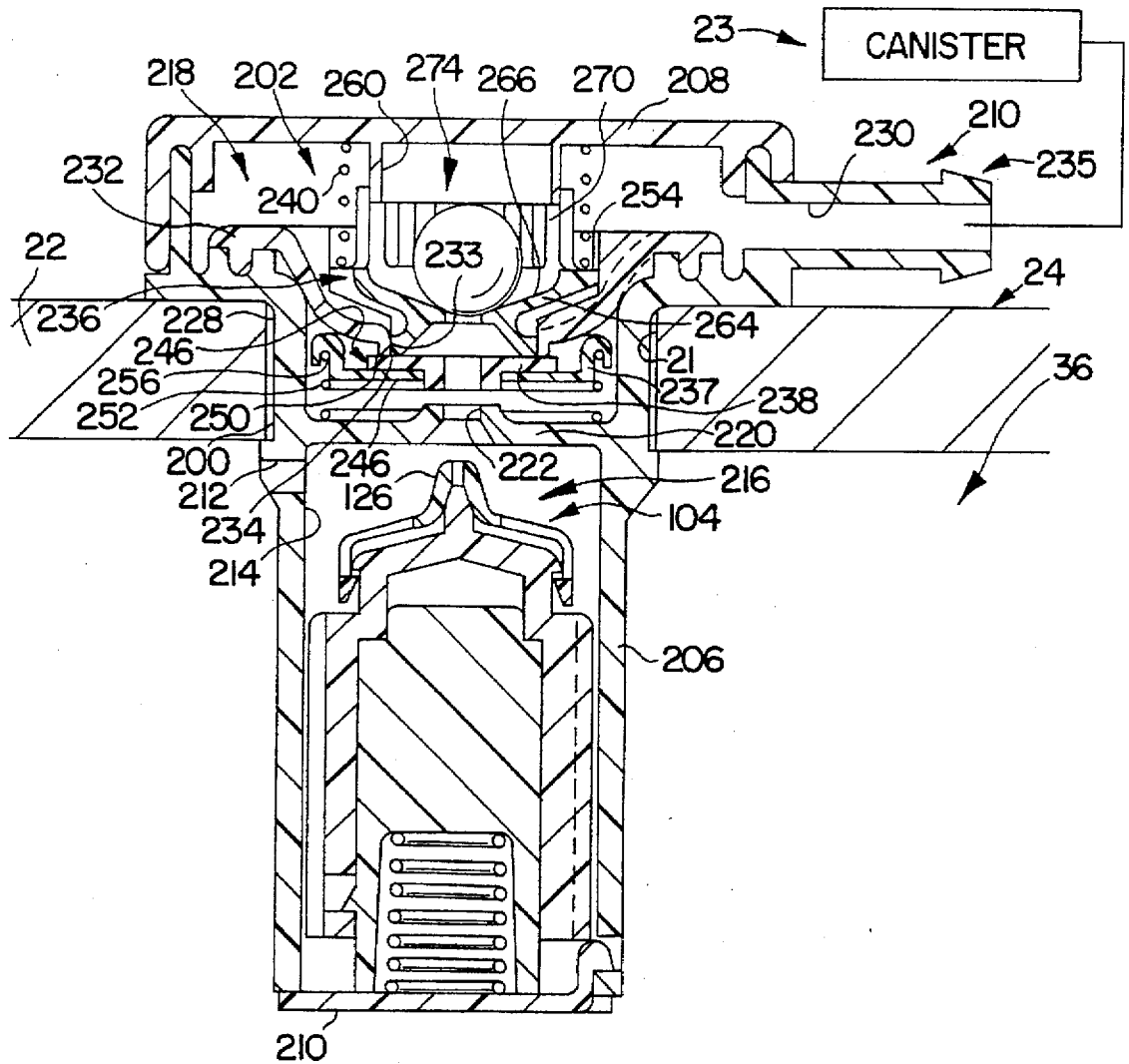
FIG. 9 is a sectional detail view of a third embodiment of a fuel vapor control valve in accordance with the present invention showing a head valve cage that is separate from the underlying vacuum-relief valve.

The particular rollover valve assembly 104 illustrated in FIGS. 2, 9, and 14 is described in more detail in U.S. Pat. No. 5,028,244 to Szlaga, which description is incorporated by referenced herein. Of course, it will be understood that other types of rollover valves, including float valves, inertial ball-and-ramp type valves, and others, may be used in accordance with the invention to provide suitable rollover closure.

The venting control chamber 118 is bounded by an upper portion 128 of cylindrical portion 106, the cover 108, and the partition 120 located inside cylindrical portion 106. The upper portion 128 is formed to include an outlet passage 130 passing through venting outlet 35 and discharging pressurized fuel vapor from the fuel tank 24 or admitting outside air into the fuel tank 24. The venting control assembly 102 is positioned to lie in the venting control chamber 118 for movement therein to provide means for regulating or selectively blocking the flow of fuel vapor through the venting control chamber 118, and thus through the outlet passage 130 in venting outlet 35.

An annular upwardly facing ledge 132 is formed by an inside wall of the housing 100. The ledge 132 is formed to include an upwardly facing, annular pressure-relief valve seat 134. A resilient pressure-relief valve 135 includes a support plate 136 and a sealing member 138 as shown in FIG. 2. Pressure-relief valve 135 is normally urged against the annular seat 134 as shown in FIG. 2 by a pressure-relief control spring 140 to provide a seal preventing the flow of fuel vapor out of fuel tank 24 through venting outlet 35. The spring 140 is positioned inside venting control chamber 118 to engage a downwardly facing surface 141 inside an annular side wall 142 formed in cover 108. Spring 140 also engages an upwardly facing surface 143 located inside annular side wall 144 formed on pressure-relief valve 135. The compression spring 140 has a spring constant designed to yieldably urge the pressure-relief valve 135 downwardly against the annular valve seat 134 provided on ledge 132 in housing 100.

In its closed position, the pressure-relief valve 135 is biased by spring 140 to provide a seal between the annular sealing member 138 and the annular valve seat 134. In response to fuel vapor pressure against the sealing member 138 of pressure-relief valve 135 in excess of a predetermined superatmospheric pressure, the pressure-relief valve 135 is urged upwardly away from the annular valve seat 134 on ledge 132 to open the venting aperture defined by annular valve seat 134 allowing for the discharge of pressurized fuel vapor from the fuel tank 24 and out of the venting outlet 35 through venting passage 130. Once sufficient pressurized fuel vapor has been discharged to reduce the pressure of the fuel vapor in the fuel tank 24 below the predetermined maximum tank pressure, the spring 140 once again yieldably urges the pressure-relief valve 135 downwardly against the annular valve seat 134 to a position closing the venting aperture defined by annular valve seat 134.

A vacuum-relief valve 146 is positioned to lie beneath the pressure-relief valve 135 as shown best in FIG. 2. Vacuum-relief valve 136 includes a radially outwardly extending annular ledge 148 and an upstanding annular sealing rim 150 appended to the ledge 148. A vacuum-relief control spring 152 normally urges the overlying sealing surface 138 of the pressure-relief valve member 136 to provide an annular seal preventing the flow of fuel vapor or air into the fuel tank 24 through a central aperture 153 formed in pressure-relief valve 135. The vacuum-relief control spring 152 lies in a lower portion of venting control chamber 118 and has a lower end positioned in annular groove 154 formed in the partition 120 and an upper end positioned in annular groove 156 formed in the vacuum valve ledge 148. Spring 152 has a spring constant designed to yieldably urge the vacuum-relief valve 146 upwardly against the annular sealing member 138 of the pressure-relief valve 135 normally to close central aperture 153 formed in pressure-relief valve 135.

In its closed position, the vacuum-relief valve 146 provides a seal between the sealing member 138 of the pressure-relief valve 135 and the sealing rim 150. Once the pressure in the fuel tank 24 falls to reach a predetermined subatmospheric pressure, vacuum-relief valve 146 is drawn downwardly away from the pressure-relief valve 135 to open the central aperture 153, thereby allowing the flow of fuel vapor or air into the fuel tank 24 through venting outlet 35 and venting control chamber 118. Once sufficient fuel vapor or air has entered the fuel tank 24 through the fuel vapor control valve 10 to raise the pressure in the fuel tank 24 above the predetermined minimum tank pressure, the vacuum-relief control spring 152 yieldably urges the vacuum valve member 146 in an upward direction against the sealing member 138 to close central aperture 153 formed in the pressure-relief valve 135.

The vacuum-relief valve 146 includes an annular lower wall 158 appended to the underside of the ledge 148. The annular lower wall 158 slidably engages an upstanding annular guide wall 160 appended to the top side of partition 120 as shown in FIG. 2. The annular guide wall 160 fits inside a cylindrical cavity 162 formed inside annular lower wall 158. Guide wall 160 is sized to guide upward and downward movement of the vacuum-relief valve 146 during opening and closing of vacuum-relief valve 146.

The vacuum-relief valve 146 further includes a conical base 164 appended to ledge 148 as shown in FIG. 2. The conical base 164 is formed to define an upwardly facing, generally conical ramp portion 166 centered around a central venting aperture 168. An annular upper wall 170 is appended to the conical base 164 and arranged to surround the conical ramp portion 166 and the central venting aperture 168. A ball-type head valve 172 is positioned for lateral movement within a ball-receiving space 174 defined by conical base 164, the surrounding annular upper wall 170, and the overlying housing cover 108. The sealing ball 172 functions to provide a pressure-relief head valve that moves to open venting aperture 168 in response to vehicle motion.

The sealing ball 172 is sized to rest on the conical ramp portion 166 and to seat in and close the venting aperture 168 when the fuel vapor control valve 10 is in a stationary condition as shown in FIG. 2. The conical ramp portion 166, the sealing ball 172, and the venting conical aperture 168 are sized and shaped to permit the sealing ball 172 to be displaced relatively easily from its normal position closing the venting aperture 168 when the vehicle (not shown) carrying fuel tank 24 and the fuel vapor control valve 10 are disturbed, such as when the vehicle is in motion.

The annular upper wall 170 provides a head valve cage to retain the sealing ball 172 generally in a position above the venting aperture 168 formed in conical base 166. As illustrated in FIGS. 2–6, the annular upper wall 170 has an inner diameter somewhat greater than the outer diameter of the sealing ball 172. The greater inner diameter of the annular wall 170 is provided to permit the sealing ball 172 to move laterally upon the conical ramp portion 166 whenever the vehicle is in motion. It will be understood that permitting the sealing ball 172 to move laterally upon the conical ramp portion 166 permits the sealing ball 172 to move away from and open the venting aperture 168, thereby allowing open flow into and out of the fuel tank 24 through the venting aperture 168. Thus, this lateral movement, or "rattle" of the sealing ball 172 permits generally unrestricted venting of the fuel tank 24 when the vehicle is in motion.

However, when the vehicle is not in motion, the weight of sealing ball 172 generates a preselected, yieldable sealing force acting on sealing ball 172 to cause sealing ball 172 to seal and close the venting aperture 168. The sealing ball 172 functions to determine the head pressure that develops within the fuel tank 24 during refueling operations. This preselected head pressure within the fuel tank 24 is advantageous during the tank-filling operation of the fuel tank 24 and will be discussed in greater detail below.

A sequence of operation of the tank venting control assembly 102 is illustrated in FIGS. 2–6. Referring to FIG. 2, upper spring 140 normally acts to urge the sealing member 138 of the pressure-relief valve 135 downwardly to its flow-blocking position against the underlying annular valve seat 134. Lower spring 152 normally acts to urge the annular rim 150 on the vacuum-relief valve 146 upwardly to its flow-blocking position against the sealing member 138 and closing the central aperture 153 formed in pressure-relief valve 135. At the same time, the sealing ball 172 closes the venting aperture 168 formed in vacuum-relief valve 146. Thus, no fuel vapor is conducted from the vapor space 36 in the fuel tank 24 to the venting outlet 35 through the venting control assembly 102, and no fuel vapor from fuel vapor storage canister 23 or air from the atmosphere is conducted through venting outlet 35 and tank venting control assembly 102 into the vapor space 36 in the fuel tank 24.

Because the liquid fuel 26 (shown in FIG. 1) is capable of expanding within the fuel tank 24 under certain temperature conditions, and because the liquid fuel 26 is capable of producing fuel vapor, it is desirable to limit the level of the liquid fuel 26 to a level somewhat below the upper wall 22 of the fuel tank 24 in the tank-filling operation to accommodate this expansion of fuel or creation of fuel vapor. This space is illustrated in FIG. 1 as an expansion volume or "vapor space" 36. The amount of the expansion volume 36 is generally dictated by the position of the inner end 34 of the filler neck 28 below the top wall 22 of fuel tank 24. When the liquid fuel level within the fuel tank 24 rises above the inner end 34 of the filler neck 28, the liquid fuel 26 being introduced into the filler neck 28 then rises up the filler neck 28 to provide an indication to either the operator or an automatic shutoff on the fuel-dispensing nozzle (not shown) to shut off the input of liquid fuel into filler neck 28. When this procedure is followed, the desirable expansion volume 36 is created in the upper portion of the fuel tank 24.

When the filler neck 28 is full of liquid fuel, the level of the liquid fuel within the filler neck 28 will be normally higher than the level of the liquid fuel within the fuel tank 24. It will be understood that this higher level of liquid fuel in the filler neck 28 creates a pressure, or "pressure head" that is exerted into the fuel tank 24. This pressure head will vary depending upon the distance that the level of liquid fuel in the filler neck 28 exceeds the level of liquid fuel 26 in the fuel tank 24.

If the tank venting control assembly 102 permitted generally unrestricted vapor release during this tank-filling operation, it will be understood that the pressure head created by the liquid fuel in the filler neck 28 could cause the expansion volume 36 to decrease. This could occur because the pressure within the expansion volume 36 would be permitted to vent through the tank venting control assembly 102, which venting which would allow the fuel in the filler neck 28 to flow into the fuel tank 24 to cause the level of liquid fuel 26 to rise in the fuel tank 24. As previously discussed, it is desirable to maintain a preselected amount of expansion volume 36 in the fuel tank 24. To prevent the level of liquid fuel 26 from rising in the fuel tank 24 due to the pressure head created by the liquid fuel 26 in the filler neck 28, it is necessary to maintain a pressure head in the fuel tank 24 to overcome the pressure head created in the filler neck 28.

To provide the pressure head in the fuel tank 24 necessary to maintain the desired amount of expansion volume 36, it is necessary to disable the venting capability of the tank venting control assembly 102 during the tank-filling operation. To disable the fuel vapor control valve 10, the sealing ball 172 is configured to seat in and close the venting aperture 168 formed in vacuum-relief valve 46 when the vehicle is stationary. This permits the sealing ball 172 to close the venting aperture 168 so as to close off the venting capability of the tank venting control assembly 102 in fuel vapor control valve 10. The weight of the sealing ball 172 is selected to maintain the proper pressure head within the fuel tank 24 to maintain the desired amount of expansion volume 36 during refueling. Illustratively, if the filler neck 28 extends 10 inches (25.4 cm) above the upper wall 22 of the fuel tank 24, then the ball 172 can be selected to maintain a pressure head of 12 inches (30.5 cm) in the fuel tank 24. This will prevent the pressure head created in the filler neck 28 from reducing the desired amount of expansion volume 36 in the fuel tank 24 during refueling.

Figure 3:
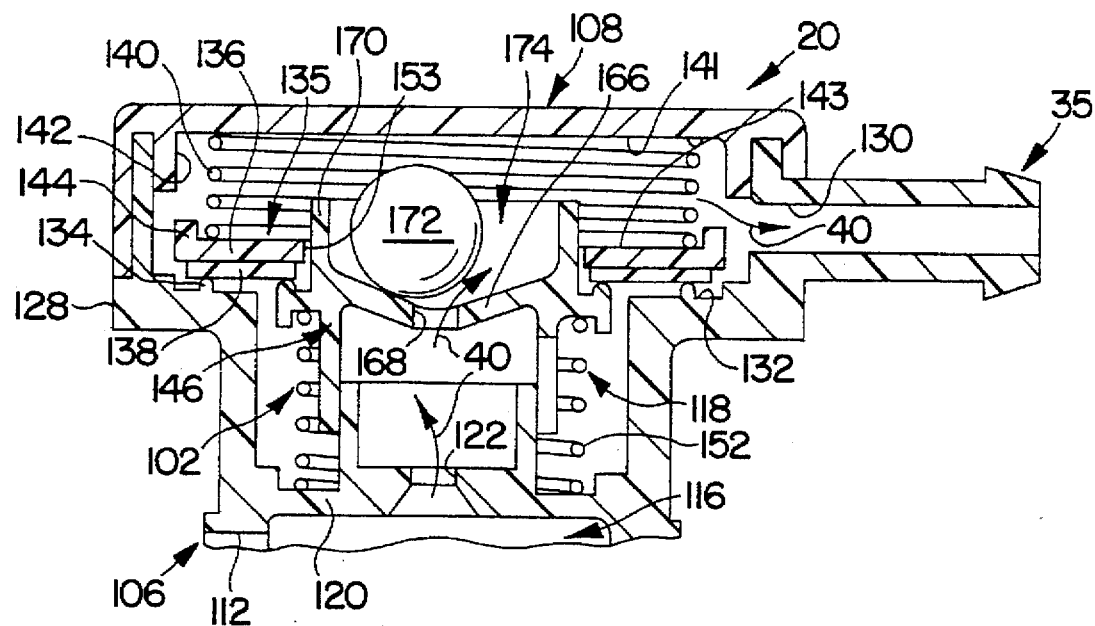
FIG. 3 is a view of a top portion of the fuel vapor control valve illustrated in FIG. 2 showing lateral displacement of the ball-type head valve during vehicle motion resulting in the flow of pressurized fuel vapor from the vehicle fuel tank to the venting outlet through a venting aperture formed in the vacuum-relief valve and uncovered by lateral displacement of the ball-type head valve.

After the tank-filling operation is complete, and the proper expansion volume 36 in fuel tank 24 has been created, it is desirable to permit generally unrestricted venting from the fuel tank 24 through the tank venting control assembly 102 in fuel vapor control valve 10. To permit this generally unrestricted venting, the sealing ball 172, the annular upper wall 170, and the conical ramp portion 166 cooperate to permit the sealing ball 172 to rattle and move laterally within the ball-receiving space 174 to open the venting aperture 168 as shown in FIG. 3. By permitting the sealing ball 172 to move away from the venting aperture 168, the tank venting control assembly 102 then permits fuel vapor 40 to vent from the fuel tank 24 in a generally unrestricted manner. Thus, as long as the vehicle (not shown) is in motion, the sealing ball 172 is generally located on the conical ramp portion in a position opening the venting aperture 168. Thus, upon lateral acceleration of the tank venting control assembly 102 (caused by vehicle motion), the ball-type head valve 172 will be moved away from venting aperture 168, thereby allowing open flow of fuel vapor 40 through venting aperture 168 and diminishing tank pressure below the predetermined maximum pressure established by pressure-relief valve 135. This venting helps to eliminate any unwanted residual tank pressure extant in the fuel tank 24 during vehicle motion.

Figure 4:
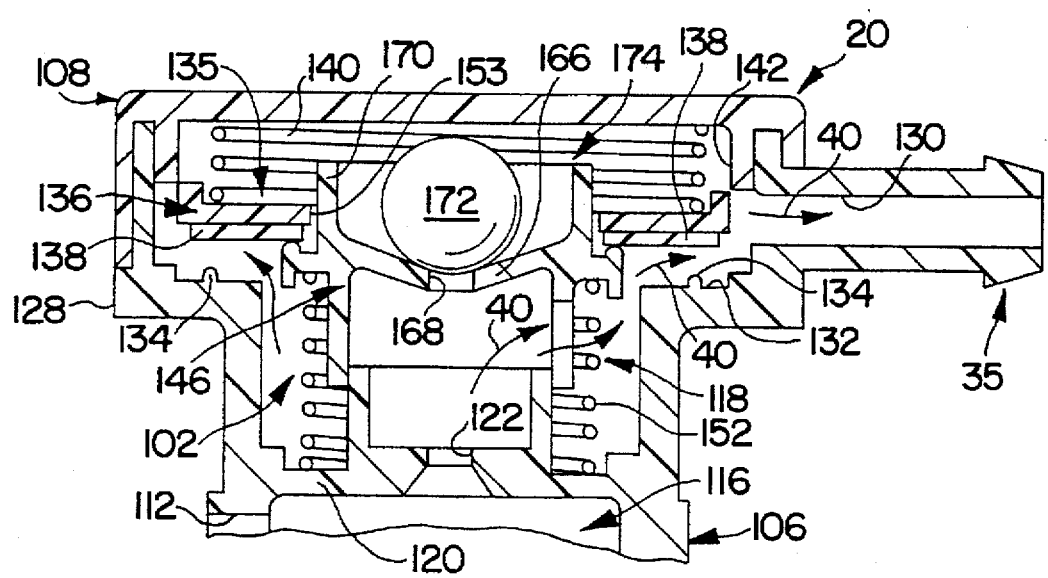
FIG. 4 is a view similar to FIG. 3 showing the fuel vapor control valve in a pressure-release position with the annular pressure-relief valve raised against its biasing spring and away from its underlying seat to permit pressurized fuel vapor in the fuel tank to flow past the pressure-relief valve to the venting outlet.

It will be understood that should the vehicle (not shown) remain stationary for a lengthy period of time after filling, the pressure in the fuel tank 24 could increase due to changes in fuel temperature. If the pressure in the fuel tank 24 exceeds the predetermined maximum pressure, the pressure-relief valve 135 will be forced upward, compressing spring 140 and disengaging sealing member 138 from annular valve seat 134 to permit the flow of fuel vapor 40 from the fuel tank 24 to the venting outlet 35, as shown in FIG. 4. It will be apparent to those skilled in the art that by varying the material of the spring 140, the physical dimensions of the spring 140, or in some other way altering the spring constant of the spring 140, one may vary the predetermined maximum pressure allowed in fuel tank 24.

It will also be understood that a vehicle (not shown) in motion could experience high-pressure levels of the fuel vapor in the fuel tank 24. If the pressure in the fuel tank 24 exceeds the predetermined maximum pressure while the vehicle is in motion, the pressure-relief valve 135 will be forced upward, compressing upper spring 140 and disengaging sealing member 138 from annular valve seat 134 to open a first path for the flow of fuel vapor a from the fuel tank 24 to the venting outlet 35 as shown in FIG. 5. In addition, rattle of the sealing ball 172 caused by lateral forces present during vehicle transit will result in generally unrestricted venting through the venting aperture 168, opening a second path for the flow of fuel vapor 40b from the fuel tank 24 to the venting outlet 35, as also shown in FIG. 5. It is expected that development of conditions which would cause venting past both the pressure-relief valve 135 and the ball 172 will not occur frequently.

Finally, it will be understood that should the vehicle (not shown) remain stationary for a lengthy period of time, the pressure in the fuel tank 24 could decrease due to changes in fuel temperature. If the pressure in the fuel tank 24 is less than the predetermined minimum pressure, the vacuum-relief valve 146 will be pulled downward by suction forces caused by subatmospheric pressure in fuel tank 24, compressing lower spring 152, and disengaging the rim 150 from the sealing member 138 to permit the flow of air and/or fuel vapor from the venting outlet 35 to the fuel tank 24, as shown in FIG. 6. It will be apparent to those skilled in the art that by varying the material of the spring 152, the physical dimensions of the spring 152, or in some other way altering the spring constant of the spring 152, one may vary the predetermined minimum pressure allowed in the fuel tank 24.

A second embodiment of the invention is shown in FIGS. 7 and 8. In this embodiment, a pressure-relief valve subassembly 188 is provided to make it easier to install pressure-relief control spring 140 in venting control chamber 118. In operation, this second embodiment is the same as the first embodiment shown in FIGS. 2–6.

The annular interior wall 114 of the venting control chamber 118 defined by housing 100 is tapered as shown in FIG. 7, angling radially inwardly from a first diameter 178 at the edge 180 of the ledge 132 to a second smaller diameter 182 adjacent to the partition 120. A base 184 on partition 120 and adjacent to the interior wall 114 forms a bottom wall of the groove 154 for positioning the lower spring 152. The second diameter 182 is sized to be slightly larger than the lower spring 152. The shape of the interior wall 114 improves the ease of assembly of the venting control assembly 102 by simplifying the placement of the lower spring 152 and by holding the lower spring 152 in position during subsequent assembly operations.

The addition of an annular spring-loading piece 186 allows for the manufacture of a pressure-relief valve subassembly 188, illustrated in FIG. 8. The pressure-relief valve subassembly 188 includes housing cover 108, pressure-relief control spring 140, pressure-relief valve 135, and annular spring-loading piece 186. An annular wall 190 is integrally appended to the cover 108 and extends downward therefrom, terminating in a radially inwardly extending annular ledge 191 as shown in FIGS. 7 and 8. The spring-loading piece 186 is an annular piece sized to fit inside of the annular wall 190 as shown in FIG. 8. The spring-loading piece 186 includes an outside wall 192 that tapers radially outwardly to form a foot 193 around the perimeter of outside wall 192. The tapered shape of outside wall 192 allows the spring-loading piece 186 to be snap-fit to the wall 190 of the cover 108. The foot 193 of the spring-loading piece 186 cooperates with ledge 191 of cover 108 to maintain engagement of cover 108 and spring-loading piece 186.

The spring-loading piece 186 further includes an annular ledge 194 sized to engage the perimeter 195 of the pressure-relief valve 135. In the finished subassembly 188, the pressure-relief valve member 135 is biased against the ledge 194 of the spring-loading piece 186. The ledge 194 cooperates with the perimeter 195 to maintain the position of the pressure-relief valve 135 in the pressure-relief valve subassembly 188.

The spring 140 is positioned on the inside of annular wall 144 to engage central portion 143 of pressure-relief valve member 136, and in the groove 196 formed in the cover 108 by annular wall 197. Both annular walls 142, 197 are integrally appended to the cover 108 and are formed to extend downwardly and away from the center of the groove 196. The shapes of walls 142, 197 improve the ease of assembly of the tank venting control assembly 102 by automatically positioning the spring 140 with respect to the cover 108 when the cover 108 and the spring-loading piece 186 are snap-fit together.

Once the pressure-relief valve subassembly 188 is assembled, adding it to the otherwise completed fuel vapor control valve 101 requires only fitting the pressure-relief valve subassembly 188 into place and ultrasonically welding the cover 108 to the housing 100. It will be apparent to one skilled in the art that other means for connecting the cover 108 and the housing 100, such as gluing or forming the pieces to snap-fit together, can be used without departing from the scope of the present invention. When the pressure-relief valve subassembly 188 is fitted onto the housing 100, the sealing member 138 of the pressure-relief valve member 136 will engage the annular valve seat 134 and the rim 150, further compressing both springs 140, 152 as shown by the completed tank venting control assembly 102 in FIG. 7.

A third embodiment of a fuel vapor control valve 210 in accordance with the present invention is illustrated in FIGS. 9–13. Fuel vapor control valve 210 includes a housing 200 containing a tank venting control assembly 202. Housing 200 is mounted in an aperture 21 formed in the top wall 22 of a vehicle fuel tank 24. The tank venting control assembly 202 is mounted in an upper portion of the housing 200 to provide venting of fuel vapor from the vehicle fuel tank 24 at relatively high vapor flow rates and to allow air to enter the vehicle fuel tank 24 when the fuel vapor pressure in the fuel tank 24 is less than a predetermined level due, e.g., to sudden cooling.

Housing 200 is formed to include a lower rollover chamber 216 containing a rollover valve assembly 104. It will be understood that other types of rollover valves, including float valves, inertial ball and ramp-type valves, and others, may be used in accordance with this invention to provide rollover closure.

The housing 200 also includes a venting control chamber 218 defined by an upper portion 228 of a cylindrical portion 206 of the housing 20, a cover 208, and a partition 220 located inside cylindrical portion 206. The partition 220 is formed to include a first venting aperture 222. The upper portion 228 of housing 200 is formed to include an outlet passage 230 in venting outlet 235 for allowing fuel vapor from the fuel tank 24, or fuel vapor or air from outside of the fuel tank, to pass therethrough. The tank venting control assembly 202 is positioned to lie in the venting control chamber 218 for movement therein to provide means for regulating or selectively blocking the flow of fuel vapor through the venting control chamber 218, and thus through the outlet passage 230 in venting outlet 235.

The tank venting control assembly 202 includes a cup-shaped first valve guide 232 fitted to the upper portion 228 of the housing 200 and positioned to lie above the first venting aperture 222 as shown in FIG. 9. The valve guide 232 includes a downwardly facing annular valve seat 250 positioned to lie in spaced-apart relation to the underlying partition 220. The valve guide 232 is formed to include a central venting aperture 233.

A vacuum-relief valve 246 is normally urged upwardly against the annular valve seat 250 by a vacuum-relief control spring 252 to close the central venting aperture 233 and prevent the flow of fuel vapor or air into the fuel tank 24 through the fuel vapor control valve 210. Spring 252 includes a lower end positioned to lie against the partition 220 at a location inside the upper portion 238 of the housing 200 and an upper end positioned to lie in an annular groove 256 formed on the vacuum-relief valve 246. Spring 252 has a spring constant for yieldably urging the vacuum-relief valve 246 against the valve seat 250. The vacuum-relief valve 246 includes an annular support plate 237 formed to include annular groove 256 and an annular sealing member 238 mounted on the annular support plate 237 as shown in FIG. 9.

Figure 10:
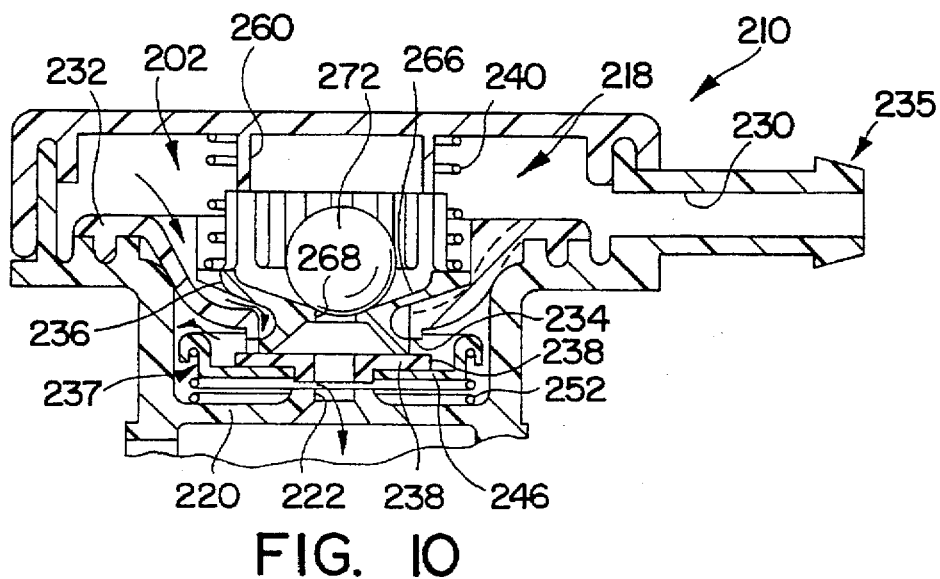
FIG. 10 is a view of a top portion of the fuel vapor control valve illustrated in FIG. 9 showing the vacuum-relief valve pulled against its biasing spring and away from an overlying annular valve seat to establish a vacuum-relief position.

In its closed position, illustrated in FIG. 9, the vacuum-relief valve 246 is biased to establish a sealed closure between the sealing member 238 and the valve seat 250. In response to the subatmospheric pressure against the vacuum-relief valve 246, the vacuum-relief valve 246 is drawn away from the valve seat 250 as shown in FIG. 10 to open a vent passageway 233, allowing the flow of fuel vapor or air from outside of the fuel tank 24, through the venting outlet 235 and venting control chamber 218 and into the fuel tank 24. Once sufficient fuel vapor or air has entered the tank 24 to raise the pressure in the tank 24 above the predetermined minimum tank pressure, spring 252 yieldably urges the sealing member 238 of the vacuum-relief valve 246 against the valve seat 250.

A pressure-relief valve 236 includes an annular seat 234 and a cup-shaped base 264. Pressure-relief valve 236 is positioned to lie within the valve guide 232 and above the sealing member 238 of the vacuum-relief valve 246. The downwardly facing annular seat 234 on the pressure-relief valve 236 is yieldably urged against the underlying sealing member 238 by a pressure-relief control spring 240 to provide a seal preventing the flow of fuel vapor out of the fuel tank 24. An annular guide wall 260 is integrally appended to the underside of housing cover 208 and is positioned to lie above the pressure-relief valve 236. The spring 240 has an upper end that is positioned to lie outside of the guide wall 260 and against the housing cover 208 and has a lower end that is received by a groove 254 that is formed by the pressure-relief valve member 236 and the valve guide 232. The spring 240 has a spring constant designed to yieldably urge the annular valve seat 234 on the pressure-relief valve 236 downwardly against the sealing member 238.

Figure 11:
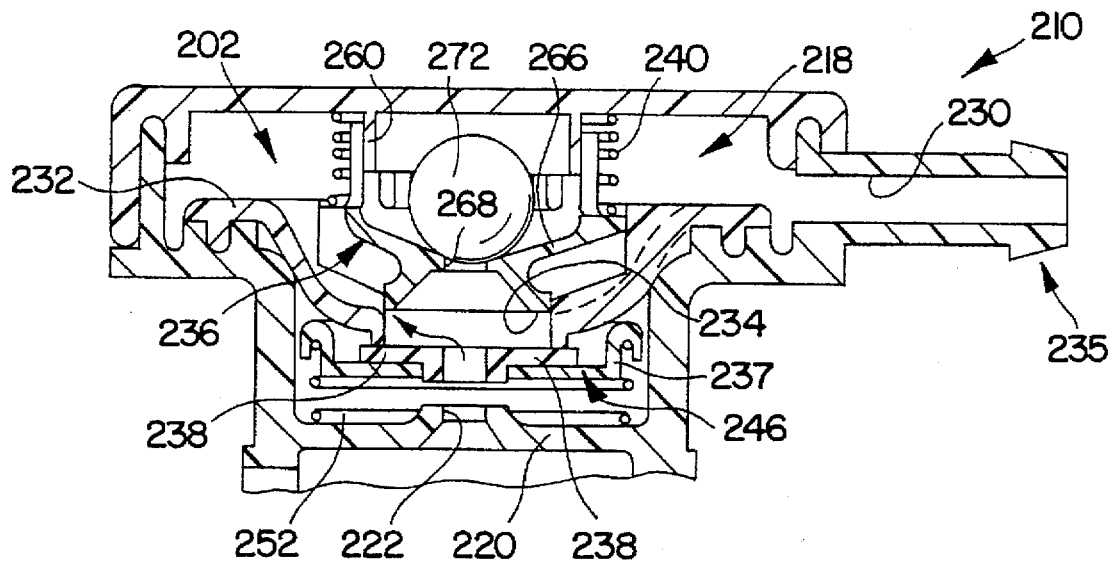
FIG. 11 is a view similar to FIG. 10 showing the pressure-relief valve in a pressure-release position raised away from a valve seat formed on the underlying vacuum-relief valve.
Figure 12:
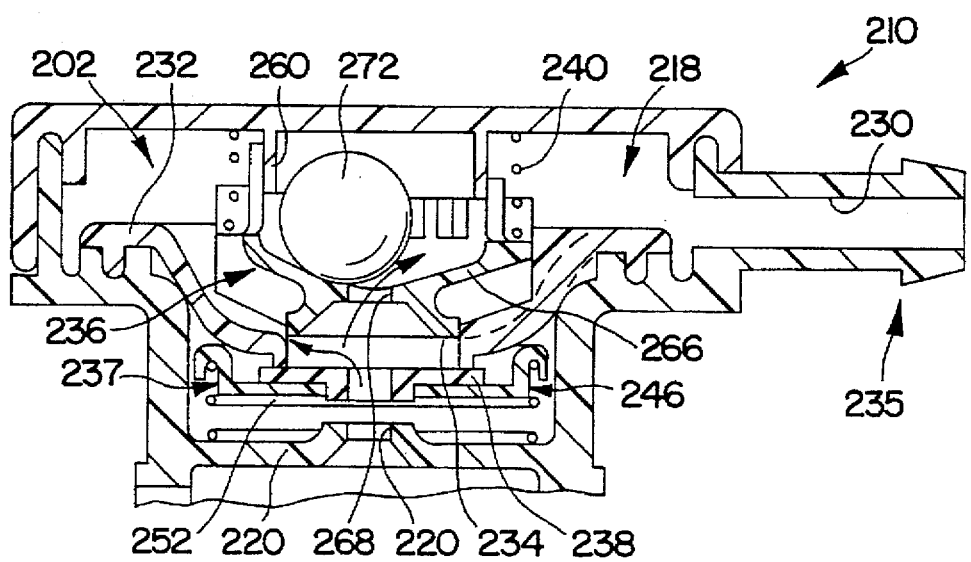
FIG. 12 is a view similar to FIGS. 10 and 11 showing the pressure-relief valve in a pressure-release position and showing movement of the ball-type head valve in the head valve cage to uncover an underlying vent aperture, thereby providing an alternative path for the escape of fuel vapor from the tank.

In its closed position, illustrated in FIG. 9, the pressure-relief valve 236 provides a seal between the sealing member 238 and the annular valve seat 234. In response to pressure in excess of a predetermined superatmospheric pressure against the pressure-relief valve 236, the pressure-relief valve member 236 is urged upwardly away from the annular valve seat 234, as shown in FIG. 11, to open the vent passageway 233 allowing for the discharge of fuel vapor from the fuel tank 24 and out of the venting passage 230 through venting outlet 235. Once sufficient fuel vapor has been discharged to reduce the pressure of the fuel vapor in the fuel tank 24 below the predetermined maximum tank pressure, the spring 240 yieldably urges the seat 234 on the pressure-relief valve 236 downwardly against the sealing member 238 included in the vacuum-relief valve 246.

The pressure-relief valve 236 further includes an upstanding annular wall 270 appended to the base 264. The annular wall 270 slidably engages the annular guide wall 260 appended to housing cover 208. The annular guide wall 260 fits inside the space 274 formed by the annular wall 270 appended to the base 264 of the pressure-relief valve 236 and is sized to guide the upward and downward movement of the pressure-relief valve 236.

The base 264 of the pressure-relief valve 236 is formed to define an upwardly facing generally conical ramp portion 266 centered around a venting aperture 268. The annular wall 270 surrounds the ramp portion 266 and the aperture 268. A sealing ball 272 is movably positioned within the ball-receiving space 274 defined by the base 264, the annular wall 270, the annular wall 260, and the housing cover 208.

The sealing ball 272 is provided to generally rest upon the conical ramp portion 266 and to seat in the venting aperture 268 when the fuel vapor control valve 210 is in a stationary condition. The conical ramp portion 266, the sealing ball 272, and the venting aperture 268 cooperate to permit the sealing ball 272 to be displaced relatively easily from its position closing the venting aperture 268 when the vehicle (not shown) and the fuel vapor control valve 210 are disturbed, such as when the vehicle is in motion. This condition is illustrated in FIG. 13.

The upper annular wall 270 is provided to retain the sealing ball 272 generally above the venting aperture 268. As illustrated in FIGS. 9–13, the annular wall 270 has an inner diameter somewhat greater than the outer diameter of the sealing ball 272. The greater inner diameter of the annular wall 270 is provided to permit the sealing ball 272 to move laterally upon the conical ramp portion 266 whenever the vehicle is in motion. It will be understood that permitting the sealing ball 272 to move laterally upon the conical ramp portion 266 permits the sealing ball 272 to move away from the venting aperture 268, allowing open flow into and out of the fuel tank 24 through the venting aperture 268. Thus, this lateral movement, or "rattle" of the sealing ball 272 permits generally unrestricted venting of the fuel tank 24 when the vehicle is in motion.

However, when the vehicle is not in motion, the sealing ball 272 provides a preselected, yieldable sealing force to seal the venting aperture 268 to maintain a preselected pressure within the fuel tank 24. This preselected pressure within the fuel tank 24 is advantageous during the tank-filling operation of the fuel tank 24 as discussed in greater detail with respect to the embodiment of FIGS. 2–6.

A fourth embodiment of a fuel vapor control valve 310 in accordance with the present invention is illustrated in FIGS. 14–16. Fuel vapor control valve 310 includes a housing 300 containing a tank venting control assembly 302. Housing 300 is mounted in an aperture 21 formed in the top wall 22 of a vehicle fuel tank 24. The tank venting control assembly 302 is mounted in an upper portion of housing 300 to provide venting of fuel vapor from the vehicle fuel tank 24 at relative high vapor flow rates and to allow air to enter the vehicle fuel tank 24 when the fuel vapor pressure in the fuel tank 24 is less than a predetermined pressure due, e.g., to sudden cooling. Illustratively, housing 300 is a two-piece assembly including a lower unit 301 positioned to lie substantially in the vapor space 36 in fuel tank 24 and an upper unit 303 positioned to lie outside fuel tank 24. It will be understood that housing 300 could alternatively be configured to resemble one-piece housings 100 and 200 shown in FIGS. 2–13.

Housing 300 is formed to include a lower rollover chamber 316 containing a rollover valve assembly 104. It will be understood that other types of rollover valves, including float valves, inertial ball and ramp-type valves, and others, may be used in accordance with this invention to provide rollover closure.

The housing 300 also includes a venting control chamber 318 defined by an upper portion 328 of a cylindrical portion 306 of the housing 300, a cover 308, and a partition 320 located inside cylindrical portion 306. The partition 320 is formed to include a venting aperture 322. The upper portion 328 of housing 300 is formed to include an outlet passage 330 in venting outlet 335 for allowing fuel vapor from the fuel tank 24, or fuel vapor or air from outside of the fuel tank, to pass therethrough. The tank venting control assembly 302 is positioned to lie in the tank venting control chamber 318 for movement therein to provide means for regulating or selectively blocking the flow of fuel vapor through the venting control chamber 318, and thus through the outlet passage 330 in venting outlet 335.

The tank venting control assembly 302 includes an annular downwardly facing ledge 332 integrally appended to an inside wall of the housing 300. The ledge 332 includes a downwardly extending annular valve seat 350. A vacuum-relief valve 346 is positioned to lie in a space between annular partition 320 and annular ledge 332. Vacuum-relief valve 346 includes a base 364 and an annular sealing member 338 appended to the base 364 and extending radially outwardly from the base 364. The sealing member 338 is yieldably urged upwardly against the valve seat 350 by vacuum-relief control spring 352 to close a venting aperture 333 formed in annular ledge 332 and prevent the flow of fuel vapor or air into the fuel tank 24. A downwardly extending annular guide wall 358 is integrally appended to the base 364. The spring 352 is positioned to surround the annular guide wall 358 and extends from the partition 320 to the underside of the sealing member 338 as shown in FIG. 14. The spring 352 has a spring constant for yieldably urging the sealing member 338 of the vacuum-relief valve 346 against the valve seat 350 on annular ledge 332.

In its closed position, illustrated in FIG. 14, the vacuum-relief valve member 346 provides a seal between the sealing member 338 and the valve seat 350. In response to the subatmospheric pressure against the vacuum-relief valve 346, the vacuum-relief valve 346 is drawn away from the valve seat 350 as shown in FIG. 15 to open a venting passageway 333 allowing the flow of fuel vapor or air from outside of the fuel tank 24, through the venting outlet 335 and the venting control chamber 318 and into the fuel tank 24. Once sufficient fuel vapor or air has entered the fuel tank 24 to raise the pressure in the fuel tank 24 above the predetermined minimum tank pressure, the spring 352 yieldably urges the sealing member 338 of the vacuum-relief valve 346 against the valve seat 350.

The base 364 of the vacuum-relief valve 346 is formed to define a second venting aperture 368. The vacuum-relief valve 346 further includes an upper annular wall 370 integrally appended to the base 364 and arranged to surround the venting aperture 368. The annular wall 370 includes a third side-discharge venting aperture 376. A sealing ball 372 is movably positioned within a ball-receiving space 374 defined by the base 364, the annular wall 370, and the cover 308. Normally, sealing ball 372 rests against an upwardly facing, generally flat valve seat 334 to block the flow of fuel vapor from the fuel tank 24 to the venting outlet 335. However, the mass and size of the sealing ball 372 are carefully selected so that the fuel vapor pressure in the fuel tank 24 will act to lift the sealing ball 372 away from valve seat 334 whenever the head pressure in the fuel tank 24 exceeds a predetermined maximum tank pressure.

In its closed position, illustrated in FIG. 14, the sealing ball 372 sealingly engages the valve seat 334 until the pressure in the fuel tank 24 reaches a predetermined superatmospheric pressure. In response to the pressure against the sealing ball 372, the sealing ball 372 is lifted away from the valve seat 334 to open the venting aperture 368 allowing for the discharge of fuel vapor from the fuel tank 24, through the second venting aperture 376, and to the venting outlet 335 as illustrated in FIG. 16. Once sufficient fuel vapor has been discharged to reduce the pressure of the fuel vapor in the fuel tank 24 below the predetermined maximum tank pressure, the pressure is no longer sufficient to suspend the sealing ball 372 over the venting aperture 368, bringing the sealing ball 372 back into sealing engagement with the valve seat 334.

Although the invention has been described in detail with reference to preferred embodiments, additional variations and modifications exist within the scope and spirit of the invention as described and defined in the following claims.

I claim:

1. A fuel vapor control valve for controlling the flow of fuel vapor and liquid fuel through an aperture in a fuel tank, the fuel vapor control valve comprising a housing mounted in the aperture and formed to include an inlet in fluid communication with the fuel tank and an outlet, a chamber disposed in the housing in fluid communication with the inlet and the outlet, a pressure-relief valve disposed in the chamber, a vacuum valve disposed in the chamber and formed for movement relative to the pressure-relief-valve, the vacuum valve being biased to relieve subatmospheric tank pressure below a predetermined minimum pressure and including a base mounted on the pressure-relief valve and arranged to define a venting aperture, and a ball movably positioned in the chamber to selectively interrupt the flow of fuel vapor through the venting aperture.

2. The fuel vapor control valve of claim 1, wherein the pressure-relief valve is biased to relieve superatmospheric tank pressure when tank pressure exceeds a predetermined maximum pressure.

3. The fuel vapor control valve of claim 2, wherein the pressure-relief valve sealingly engages the vacuum valve when the tank pressure is below the predetermined maximum pressure and above the predetermined minimum pressure.

4. The fuel vapor control valve of claim 3, wherein the ball has a predetermined weight sufficient to interrupt the flow of fuel vapor through the venting aperture so long as the vehicle remains substantially stationary and the tank pressure does not exceed the predetermined maximum pressure.

5. The fuel vapor control valve of claim 2, wherein the pressure-relief valve further includes a base and the vacuum valve sealingly engages the pressure-relief valve base.

6. The fuel vapor control valve of claim 5, wherein an annular wall is appended to the base of the vacuum valve and is arranged to surround the venting aperture to define a ball-receiving space.

7. A fuel vapor control valve for controlling the flow of fuel vapor and liquid fuel through an aperture in a fuel tank having a filler neck, the fuel vapor control valve comprising a housing mounted in the aperture and formed to include an inlet in fluid communication with the fuel tank, an outlet, and a valve seat, a chamber disposed in the housing between the inlet and the outlet, the chamber being in fluid communication with the inlet and the outlet, valve means for relieving fuel tank pressure when the pressure differential between the inlet and the outlet exceeds a predetermined maximum, the valve means including a base biased against and movable relative to the valve seat, and interrupting means for selectively interrupting the flow of fuel vapor through the outlet when the fuel vapor control valve is not subject to a lateral acceleration, the interrupting means being mounted on the base of the valve means to develop head pressure in the fuel tank in excess of a maximum pressure head in the filler neck resulting from filling the filler neck with fuel during refueling and being formed for movement in the chamber relative to the valve means.

8. The fuel vapor control valve of claim 7, wherein the interrupting means includes means to develop head pressure in the fuel tank in excess of a maximum pressure head in the filler neck resulting from filling the filler neck with fuel during refueling.

9. A fuel vapor control valve for controlling the flow of fuel vapor and liquid fuel through an aperture in a fuel tank having a filler neck, the fuel vapor control valve comprising a housing mounted in the aperture and formed to include an inlet in fluid communication with the fuel tank and an outlet, a chamber disposed in the housing between the inlet and the outlet, the chamber being in fluid communication with the inlet and the outlet, valve means for relieving fuel tank pressure when the pressure differential between the inlet and the outlet exceeds a predetermined maximum, the valve means including pressure-relief valve means for relieving fuel tank pressure when the inlet pressure is above a predetermined maximum and vacuum-relief valve means for relieving fuel tank pressure when the inlet pressure is below a predetermined minimum, and interrupting means for selectively interrupting the flow of fuel vapor through the outlet when the fuel vapor control valve is not subject to a lateral acceleration, the interrupting means being mounted on the valve means and the interrupting means including means to develop head pressure in the fuel tank in excess of a maximum pressure head in the filler neck resulting from filling the filler neck with fuel during refueling.

10. The fuel vapor control valve of claim 9, wherein the vacuum-relief valve means sealingly engages the pressure-relief valve means when the pressure differential between the inlet and the outlet does not exceed the predetermined maximum.

11. The fuel vapor control valve of claim 10, wherein the interrupting means is mounted on the vacuum-relief valve means.

12. A fuel tank pressure control valve for controlling the pressure of fuel vapor in a vehicle fuel tank, the fuel tank pressure control valve comprising a housing mounted through the top wall of the fuel tank and formed to include an inlet and an outlet, and a pressure control assembly disposed in the housing, the pressure control assembly including pressure-relief means for relieving superatmospheric fuel tank pressure above a predetermined maximum pressure, vacuum-relief means for relieving subatmospheric fuel tank pressure below a predetermined minimum pressure, and equalizing means for equalizing the tank pressure and atmospheric pressure when the vehicle is in motion, the vacuum-relief means including a base movable in the housing relative to the inlet and outlet and defining a venting aperture and the equalizing means being positioned to lie on the base of the vacuum-relief means.

13. The fuel tank pressure control valve of claim 12, wherein the base includes a vent aperture therethrough and the equalizing means is sized to selectively cover the vent aperture.

14. A fuel vapor control valve for controlling the flow of fuel vapor through an aperture in a vehicle fuel tank, the fuel vapor control valve comprising a housing mounted in the aperture, the housing including a ledge and a vent passageway, a vacuum valve positioned in the vent passageway of the housing and arranged to obstruct vapor flow into the fuel tank when the vehicle is stationary and the tank pressure is above a predetermined minimum threshold pressure, the vacuum valve including a base arranged for movement in the vent passageway and formed to define a venting aperture, a first pressure-relief valve positioned in the vent passageway of housing and arranged to obstruct the flow of fuel vapor out of the fuel tank when the vehicle is stationary and the pressure in the fuel tank is below a predetermined maximum threshold pressure, the first pressure-relief valve including a base formed for biased engagement with the ledge, and a second pressure-relief valve positioned in the housing upon the base of the vacuum valve and arranged to permit the flow of fuel vapor through the venting aperture when the vehicle is in motion.

15. The fuel vapor control valve of claim 14, wherein the second pressure-relief valve is mounted on the vacuum valve.

16. The fuel vapor control valve of claim 15, wherein the vacuum valve sealingly engages the first pressure-relief valve when the tank pressure is above the predetermined minimum threshold pressure and the tank pressure is below the predetermined maximum threshold pressure.

17. The fuel vapor control valve of claim 15, wherein the second pressure-relief valve includes the vacuum valve base arranged to define a second vent passageway and a ball movably positioned adjacent to the base and sized to sealingly engage the second vent passageway.

18. The fuel vapor control valve of claim 17, wherein the second pressure-relief valve includes an annular wall mounted on the vacuum valve base and arranged to surround the second vent passageway to define a ball-receiving space and to move with the vacuum valve base in the vent passageway relative to the first pressure-relief valve.

19. A fuel vapor control valve for controlling the flow of fuel vapor through an aperture in a vehicle fuel tank, the fuel vapor control valve comprising a housing mounted in the aperture, the housing including a vent passageway, a first pressure-relief valve positioned in the housing and arranged to release fuel vapor from the fuel tank when the pressure in the fuel tank exceeds a predetermined maximum pressure, a vacuum valve positioned in the housing and arranged to permit vapor flow into the fuel tank when the pressure in the fuel tank is less than a predetermined minimum pressure, the vacuum valve including a base, and a second pressure-relief valve positioned in the housing on the base of the vacuum valve and arranged to relieve fuel tank pressure when the vehicle is in motion.

20. The fuel vapor control valve of claim 19, wherein the the base of the vacuum valve is arranged to define a second pressure-relief valve seat for sealingly engaging the second pressure-relief valve.

21. The fuel vapor control valve of claim 20, wherein the first pressure-relief valve includes a base arranged to define a vacuum valve seat for sealingly engaging the vacuum valve.

22. The fuel vapor control valve of claim 21, wherein the housing includes an annular interior wall arranged to define a first pressure-relief valve seat for sealingly engaging the first pressure-relief valve.

23. A fuel vapor control valve for controlling the flow of fuel vapor and liquid fuel through an aperture in a fuel tank, the fuel vapor control valve comprising a housing mounted in the aperture and formed to include an inlet and an outlet, a chamber positioned between the inlet and the outlet, a pressure-relief valve positioned in the chamber and biased to discharge fuel vapor from the tank when the pressure of the fuel vapor exceeds a predetermined threshold, the pressure-relief valve including a base arranged for movement in the chamber and formed to define a venting aperture interconnecting the inlet and outlet in fluid communication, and a ball movably positioned in the chamber and sized to sealingly engage the venting aperture.

24. The fuel vapor control valve of claim 23, further including a vacuum valve positioned in the chamber and biased to relieve subatmospheric pressure below a predetermined threshold in the fuel tank, the vacuum valve being formed for movement in the chamber relative to the pressure-relief valve.

25. In a fuel tank having a filler neck, the fuel tank including a fuel vapor control valve for controlling the flow of fuel vapor and liquid through an aperture, the fuel vapor control valve including a housing mounted in the aperture and formed to include an outlet positioned outside the fuel tank, a float valve positioned in the fuel tank being movable in the housing between a closed position blocking flow of fuel vapor and liquid fuel through the outlet and an open position allowing flow of fuel vapor through the outlet, and a chamber positioned between the outlet and the float valve, a pressure-relief apparatus positioned internal to the chamber for preventing undesired pressure differentials between the float valve and the outlet, the pressure-relief apparatus comprising a pressure-relief valve, a vacuum-relief valve mounted on the pressure-relief valve and movable in the chamber relative to the pressure-relief valve between a closed position blocking the flow of fuel vapor through the outlet and an open position allowing the flow of fuel vapor through the outlet when the tank pressure is less than a predetermined minimum pressure, the vacuum-relief valve including a base arranged to define a venting aperture, an annular wall appended to the base and arranged to encircle the venting aperture, the base, the annular wall, and the chamber defining a ball-receiving space, and a ball positioned in the ball-receiving space and sized to sealingly engage the venting aperture.

26. A fuel vapor control valve for controlling the flow of fuel vapor and liquid fuel through an aperture in a fuel tank having a filler neck, the fuel vapor control valve comprising a housing mounted in the aperture and formed to include an inlet in fluid communication with the fuel tank and an outlet, a chamber disposed in the housing between the inlet and the outlet, the chamber being in fluid communication with the inlet and the outlet, a pressure-relief valve positioned in the chamber, a vacuum-relief unit mounted on the pressure-relief valve, the vacuum-relief unit including a vacuum valve formed for movement in the chamber relative to the pressure-relief valve and a ball movably positioned in the chamber and resting on the vacuum valve wherein the vacuum valve is formed to include a base and a venting aperture extending through the base and the ball rests upon the base.

27. The fuel vapor control valve of claim 7, wherein the interrupting means includes vacuum-relief valve means for relieving fuel tank pressure when the inlet pressure is below a predetermined minimum.

28. The fuel vapor control valve of claim 27, wherein the interrupting means includes a ball movably positioned on the vacuum-relief valve means.

29. The pressure-relief of claim 25, wherein the pressure-relief valve is biased against the housing.

30. The pressure-relief of claim 25, wherein the base of the vacuum-relief valve is biased against the pressure-relief valve.

31. The fuel tank pressure control valve of claim 12, wherein the equalizing means is movable relative to the pressure-relief means.

* * * * *